(12) United States Patent
Levin et al.

(10) Patent No.: US 6,434,556 B1
(45) Date of Patent: Aug. 13, 2002

(54) VISUALIZATION OF INTERNET SEARCH INFORMATION

(75) Inventors: James A. Levin, Savoy; Daniel A. Kauwell, Urbana, both of IL (US)

(73) Assignee: Board of Trustees of the University of Illinois, Urbana, IL (US)

(*) Notice: Subject to any disclaimer, the term of this patent is extended or adjusted under 35 U.S.C. 154(b) by 0 days.

(21) Appl. No.: 09/293,281

(22) Filed: Apr. 16, 1999

(51) Int. Cl.[7] .............................................. G06F 17/30
(52) U.S. Cl. ..................... 707/5; 707/3; 707/4; 707/10; 707/104; 345/835
(58) Field of Search .......................... 707/2, 4, 10, 104, 707/3, 5, 6, 500, 530, 531, 100, 103, 201, 9; 345/835, 440; 704/270.1

(56) References Cited

U.S. PATENT DOCUMENTS

| | | | |
|---|---|---|---|
| 5,590,250 A | 12/1996 | Lamping et al. | 395/127 |
| 5,640,553 A | 6/1997 | Schultz | 395/605 |
| 5,737,734 A | 4/1998 | Schultz | 707/5 |
| 5,748,954 A * | 5/1998 | Mauldin | 707/10 |
| 5,812,134 A | 9/1998 | Pooser et al. | 345/356 |
| 5,819,273 A | 10/1998 | Vora et al. | 707/10 |
| 5,848,410 A | 12/1998 | Walls et al. | 707/4 |
| 5,857,181 A * | 1/1999 | Augenbraun et al. | 707/2 |
| 5,870,559 A * | 2/1999 | Leshem et al. | 709/224 |
| 5,870,740 A | 2/1999 | Rose et al. | 707/5 |
| 5,873,076 A | 2/1999 | Barr et al. | 707/3 |
| 5,877,766 A | 3/1999 | Bates et al. | 345/357 |
| 6,006,217 A * | 12/1999 | Lumsden | 707/2 |
| 6,078,866 A * | 6/2000 | Buck et al. | 702/2 |

OTHER PUBLICATIONS

"WebQuery: Searching and Visualizing the Web through Connectivity", http://www.cgl.uwaterloo.ca/Projects/Vanish/webquery-1.html, downloaded Mar. 3, 1999.

* cited by examiner

Primary Examiner—Jean M. Corrielus
(74) Attorney, Agent, or Firm—Gardner Carton & Douglas

(57) ABSTRACT

A method and system for presenting a visual representation of search results relating to information on a computer network. A complex relevance rating scheme for generating a relevance rating for each match of the search results. The display space is defined with a display space relevance profile. A visual representation of the matches is determined and positioned within the display space according to the match relevance rating and the display space relevance profile.

20 Claims, 11 Drawing Sheets

SEARCH RESULT RELEVANCE PROFILE
PREFERENCE SELECTION

FIGURE 3A

**SET PREFERENCES AND
SELECT SEARCH ENGINES**

MAXIMUM NUMBER OF MATCHES                          DEFAULT SETTINGS

SITES    ☐                                                          10

PAGES ☐                                                          100

INTENSITY

VISITED NODE     ☐     (H/L)     HIGH

UNVISITED NODE ☐     (H/L)     LOW

DISPLAY SPACE RELEVANCE PROFILE

LEFT ⟶ RIGHT     UP ⟶ DOWN     CENTRAL ⟶ OUT
    ☒                 ☒                ☐

SEARCH ENGINES

YAHOO     LYCOS     INFOSEEK  ■ ■ ■  EXCITE
☒         ☐          ☒                      ☐

■

■

■

COLORS

NODE FOUND BY ENGINE     ☐     GREEN

NODE ADDED DURING ANALYSIS ☐     BLUE

VISUALIZATION OF INTERNET SEARCH INFORMATION

FIELD OF THE INVENTION

The present invention relates generally to a method and system for presenting a visual representation of information on a computer system. More particularly, the present invention provides a method and system for effective human visual comprehension of search results relating to information available on the Internet.

BACKGROUND OF THE INVENTION

With the development of the modem computer system, a massive volume of information may be readily stored, accessed and analyzed. Improvements in mass information storage media and development of new types of mass storage media now allow individuals to access millions of pages of information. Through networks of computers, an individual can further increase the volume of accessible information millions of times.

The Internet, rapidly increasing in popularity and usage, allows millions of users around the world access to the information on a network of millions of computers. The World Wide Web of the Internet is one of the most popular sources of Internet information and represents a collection of hundreds of millions of pages of information stored on millions of computers throughout the world. With low-cost and user-friendly software, even novice computer users are able to easily organize their own set of information which can be accessible by others over the World Wide Web of the Internet. Many of the pages of information on the Internet also include addresses or "links" to other pages of information that may be readily accessed upon a single and simple click of a button, which could interconnect the user with information residing on a computer system on the other side of the world, or maybe even just next door. Although presently most of the information available on the Internet is textual in nature, accessible also are massive amounts of information in which digitized images, sounds and video are stored.

Never in the history of man has there been a time when such a massive volume of information could be readily accessed by individual users. On the Internet, this information can be accessed at virtually no or little cost. However, without tools to assist users to efficiently search and comprehend the information available, this great resource of information may be largely wasted. Attempting to locate a particular subset of information of interest can be an overwhelmingly time-consuming and frustrating task. No common system of organization is followed for information available on the Internet and, since it is assembled by a diverse set of users all with different backgrounds and views, it seems unlikely that Internet information will ever be regulated by information providers for effective organization.

Recognizing the need for allowing users to search through the massive amount of information available on the Internet, a variety of commercial Internet information indexing services have been implemented, such as Yahoo, Lycos, InfoSeek, Excite and Alta Vista. Although the search algorithms and techniques used (also referred to as "search engines") are likely quite different for each of such services, the format of the information presented to a user located as a result of a search are relatively similar. Conventional search engines, after conducting the search, present the user with a list of "hits," each of which typically provides an address or link to allow a user to access the information and perhaps a short description of the information available. In many instances, a user will be presented with a list of thousands, hundreds of thousands or possibly even millions of "hits" with perhaps only a few of interest to the user. Due to the nature of the search conducted, many conventional search engines provide results that include duplicates, which further frustrates the ability of the user to efficiently locate the information of interest. For example, a search engine may attempt to search the Internet for sites that include the term "cuisine". However, if the term is used multiple times in an available document, many conventional search engines will include a "hit" for each occurrence of the term within a document.

In order to assist a user with navigation through the list of "hits," some conventional search engines attempt to rank the hits using a predetermined algorithm in an effort to estimate the relevance of each of the hits. The hits that are determined to be most relevant are placed at the top of the list, while those that are determined to be least relevant are placed at the bottom of the list. Although such a relevance ranking is sometimes useful, in practice, a user is frequently presented with many duplicate hits referring to the same information and the relevance ranking is not sophisticated so many of the hits are classified with the same ranking, presenting the user with a list of perhaps thousands of hits all of which are indicated as being of equal relevance.

These prior art techniques for searching and presenting the search results are not effective in conveying information to the user in a manner that allows the user to efficiently comprehend the volume, relevance and organization of the information located from a search. This is particularly true with respect to a search of information available on the Internet, an information source of almost unimaginable volume and inconsistent organization.

U.S. Pat. No. 5,870,740 to Rose et al. assigned to Apple Computer, Inc., discloses a method and system for improving the ranking of information retrieval results for short queries. Techniques such as this are directed to providing a more sophisticated technique for estimating the relevance of information located from a search. The Rose et al. invention attempts to improve estimated relevance determination by taking into account the degree of overlap between query terms and the terms of a located document, the query length and a "boosting" factor. Although the Rose et al. invention might improve the estimated relevancy ranking to some extent, it fails to recognize other potentially important factors of relevancy, and does not provide a suitable solution to allow a user to efficiently comprehend the results of a broad search that returned many hits. In other words, as illustrated in FIG. 5, the Rose et al. invention is representative of prior art techniques that present search result information in linear lists, a format that is particularly easy for a computer to generate but is ineffective in assisting a user in navigating and understanding the results.

A system has been proposed by Jeromy Carriere and Rick Kazman in a paper entitled "Webquery: Searching and Visualizing the Web through Connectivity." Although this paper suggests that search results may be presented visually, it does not propose a technique that may be practically implemented for the massive volume of information available from the Internet. Carriere and Kazman propose a "spider" (a program that "visits" each document or "site" within the search space where information may be located) to precompile a database containing information regarding the connectivity of data in the search space. This connectivity database is then consulted as a factor affecting relevancy of search results. The proposed technique was implemented with respect to the Internet World Wide Web sites of the University of Waterloo, a very small subset of the entire World Wide Web. The technique required the "spider" to collect information from the 200,000 sites at the University of Waterloo. Attempting to construct and maintain such a precompiled database of connectivity information is unmanageable for the entire World Wide Web because the dynamic nature of the information available and the sheer volume of information would make it impossible to complete the precompilation task for all the information available on the Internet.

SUMMARY OF THE INVENTION

The present invention provides a system and method that may be readily implemented for the entire volume of information available on the Internet for efficient searching for information and a visual presentation of search results that may be quickly comprehended by a user. The present invention further allows a variety of functions to facilitate user navigation of the search results, as well as user customization, modification and organization of the search results.

One embodiment of the invention provides for the search to be conducted by any conventional search engine. The search results are supplied to the system of the invention and further processed and analyzed to provide a useful graphical representation of the results that allow a user to quickly visually comprehend the search results. With respect to information from the Internet, the invention recognizes that interconnectivity between various "hits" from a search is an important factor that should be considered in relevance ranking and should also be part of the visual representation of the search results. Once a graphical representation is presented to the user, the graphical representation may be navigated by the user to examine the information located from the search. In addition, the user may specify that the display space be reorganized by a different "theme." For example, a search for "restaurants" could be visually organized within the display space according to themes of price, cuisine, geographical location or a different theme, the parameters of which are specified by the user.

According to a preferred embodiment of the invention, "hits" (i.e., matches from the search results) that are logically related to each other are grouped together in the display space, and each of the groups are "mapped" to predetermined areas of the display space according to the relevance of the groups as determined by the invention. For example, the most relevant group or cluster of information may be positioned in the central region of the display space, while groups and clusters of less relevance will be positioned farther away from the central region of the display space. In other words, the proximity to the central region of the display space is an indication of the relevance of the information. As will be apparent from the examples set forth herein, such a unique visual representation allows a great amount of information to be readily comprehended by a user.

To aid in navigation of the search results, the system preferably provides "mouse over" information (i.e., a temporary information box that provides some detail regarding the item over which the mouse is currently located) for each "hit" displayed in the display space. If the user clicks on a particular "hit" the search results display space is preferably redrawn in a microview and moved to a corner of the screen as the system displays in a main window the Web page relating to the hit that was selected. As the user browses through the Web page and perhaps follows other links, the microview representation of the search results display window continues to provide the user with information useful to assist with navigation. Once the user completes examination of the particular Web page, the search results display space may be redrawn in a macroview representation for the user to conduct further navigation.

According to an important aspect of the present invention, the search results display space is preferably provided with arrows that mark links between the "hits" representing search results. This feature of the invention provides the user with an efficient visual representation of the cross-connectivity between different hits from the search. For example, in the case of a search conducted upon Web pages of the Internet, some of the pages located and displayed as hits in the search results display space may, in the content of the Web pages, contains information specifying the addresses, location or links to other pages which are also displayed as hits in the search results display space. Such pages that contain links to other pages will be displayed with an arrow positioned between the representation of the two pages and indicating the direction of the link. In some searches, a page that serves primarily as a reference, i.e., a page of links to other pages, will immediately be recognized by a user because the page representation will include many arrows emanating from it toward other page representations. On the other hand, a page that contains a great deal of content on the subject matter of the search will be immediately be recognized by a user because it will probably include many arrows pointing to it from other pages. Through this unique and beneficial graphical representation, a user can quickly comprehend the size of the search results, the likely content of various search results, and can readily navigate the search results to efficiently find the information desired. In cases where a user is searching a relatively unfamiliar topic he may conduct an initial search, find a reference page (by visually recognizing the page with many arrows emanating from it), and begin navigation from that reference page. After navigating through such a reference page, the user will appreciate the information available on the search subject and can then return to the search results display space to conduct further navigation on particular topics of interest.

Another important aspect of the present invention is that the relevance ranking is preferably based upon a variety of information, instead of merely the extent that particular search terms correspond to information within a particular hit. The present invention may further consider as factors relating to relevancy: (1) the cross-connectivity of a particular hit (i.e., the number of links to/from the hit), (2) the number of times a search engine generated the node as a hit, (3) the relevancy rating for the hit as returned by the search engine, (4) the type of Web site where the hit is found (i.e., ".edu" for an education related site, ".com" for a commercial site, ".org" for an organization, ".gov" for a government site, etc.), and (5) in an embodiment where multiple search engines are used, the number of search engines reporting the node as a hit.

BRIEF DESCRIPTION OF THE DRAWINGS

The above and further advantages of the invention will be more clearly appreciated from the following detailed description when taken in conjunction with the accompanying drawings, in which:

FIG. 3A is a representation of the screen presented to a user to perform the SET PREFERENCES AND SELECT SEARCH ENGINES step of FIG. 2.

DETAILED DESCRIPTION OF THE INVENTION

In the following, the present invention is described in detail in connection with several embodiments and examples. Many of the examples relate to an application of the invention for searching and navigating information available on the Internet. However, the present invention may also be readily implemented and advantageously used in a much wider variety of applications, including, for example, to search and navigate information on any large computer network system or even a single computer system where a user is confronted with a massive volume of information that may not be organized in a manner conducive for efficient searching.

In one embodiment, the present invention may be implemented as a software tool for the Internet. The software tool may be implemented in the Java programming language, or alternatively may be implemented as a Java applet that runs within the confines of an Internet Web browser program. The software tool may also be implemented in other programming languages as well.

When described in connection with searching or displaying information on the Internet, the term "site" typically refers to a Web site on the Internet having an "address" such as, for example, "www.uiuc.edu". Located within a site may be many different nodes, which are sometimes also referred to as "pages", such as pages of information from the World Wide Web of the Internet. Typically, Web pages will include "links" to other pages which means they include within their information content a reference to an address for another Web page. Such links conveniently allow a user to access information for a variety of different pages at a variety of different sites.

Figure 1:
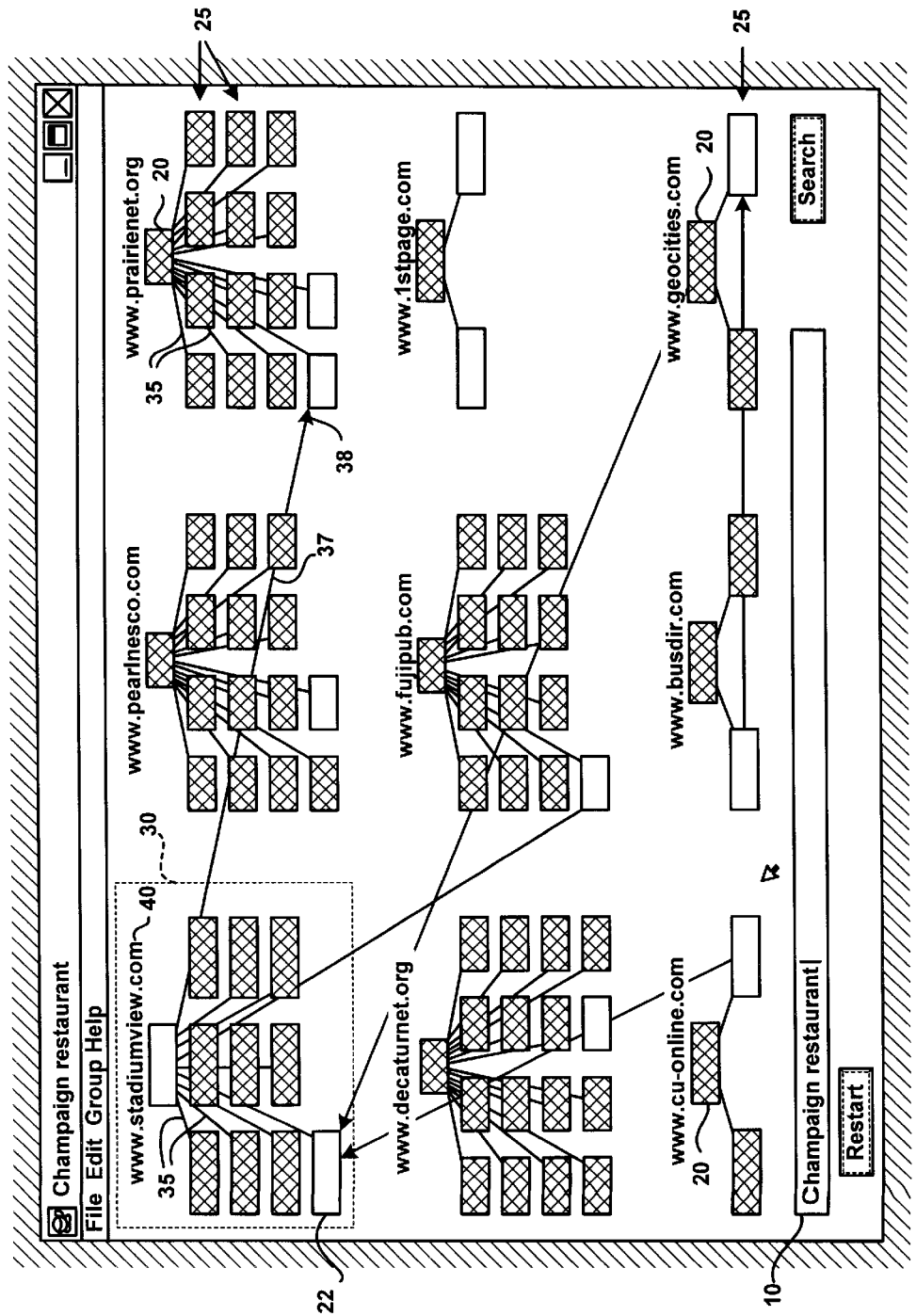
FIG. 1 is a representation of the organization and depiction of a sample search result display space in accordance with one embodiment of the present invention.

Referring first to FIG. 1, there is shown a sample search results display screen in accordance with one embodiment of the present invention. As may be recognized, the display of this sample is presented in a version of the Windows format (such as the popular Windows operating environment developed by Microsoft Corporation) which defines a display space. The display space relates to an Internet search conducted for the search query "Champaign restaurant". Nine different sites were located that correspond to the search query 10. Each of the sites contains a particular root node 20 and, as illustrated in the example, a plurality of other nodes 25. Each node represents a Web page of information relating to the search query. The nodes of a particular site are grouped together and appear as trees 30. In order to more clearly define the structure of the nodes corresponding to a particular site, in addition to being grouped together there is also illustrated a line 35 extending between the root node 20 and each of the other nodes 25 from the same site. Above the root node 20 of each site is displayed the root node address 40. For example, the site in the upper left corner of the display space corresponds to the site "www.stadiumview.com". The address of the root node appears above the root node and the related nodes within the site that corresponds to the search query are also visually represented and arranged grouped together below the root node. In the illustrated example, each node 20, 25 is represented by way of example by a rectangular box, but different shapes or icons could also be used to provide additional useful visual information to the user. For example, the root node of the upper-left corner could be replaced with a small icon appearing as a stadium in order for the user to more easily visually recognize the site as corresponding to the "www.stadiumview.com" address. As should be evident, the root node address 40 could be easily parsed to determine specific recognizable words or phrases which, in turn, could be matched against a predetermined collection of icons such that an icon that most closely corresponds to the root node address 40 may be displayed instead of the address itself.

According to an important aspect of the present invention, each group of nodes corresponding to a particular site 30 is arranged within the display space in a predetermined manner depending upon the relevance of the group and the relevance profile of the display space. For the display space corresponding to FIG. 1, the display space has a predetermined relevance profile such that information positioned in the upper left is considered the most relevant and information positioned in the lower right is considered least relevant. Preferably, a variety of different factors will be considered to determine the relevance of each site found from the search query. Such factors may include the number of pages found within the site that satisfy the query, the number of links to and from other pages found by the search query, the "closeness" of the match between the search query and the site, as well as other factors. In the illustrated example, the upper-left site is considered the most relevant because it contains many different nodes that satisfy the search query and also includes several different links to it from other nodes within the display space.

Although the display space relevance profile illustrated in FIG. 1 is arranged in an upper-left to lower-right arrangement, alternatively the display space relevance profile might be arranged in a central to peripheral arrangement where the most relevant sites are positioned in the central area of the display space while the less relevant sites are positioned farther away from the central area of the display space. With such a relevance profile for the display space, the site "www.stadiumview.com" and its associated nodes would be positioned in the most central location of the display space to denote that they are the most relevant.

A variety of different colors and highlighting may also be used for items within the display space to provide additional visual information for the user. For example, some of the nodes displayed appear lighter than other nodes. Such a difference in intensity can be used to indicate that the node has been "visited" by the user while navigating the information within the display space. A different color for a particular node could also be used to indicate that the node was not originally found by the search engine, but it was added by the process while analyzing the search results and finding that several of the nodes located contains links to (or from) that additional node. In this manner, the node structure may be completed or "filled out" to provide a fuller visual representation of the search results. For example, the lowest node 22 on the left-most leg of the "www.stadiumview.com" is depicted in a different color to represent that it was not selected by the search engine but was added when the search results were analyzed and it was found that two other nodes contain links to the lower left-most "www.stadiumview.com" node.

Figure 2:
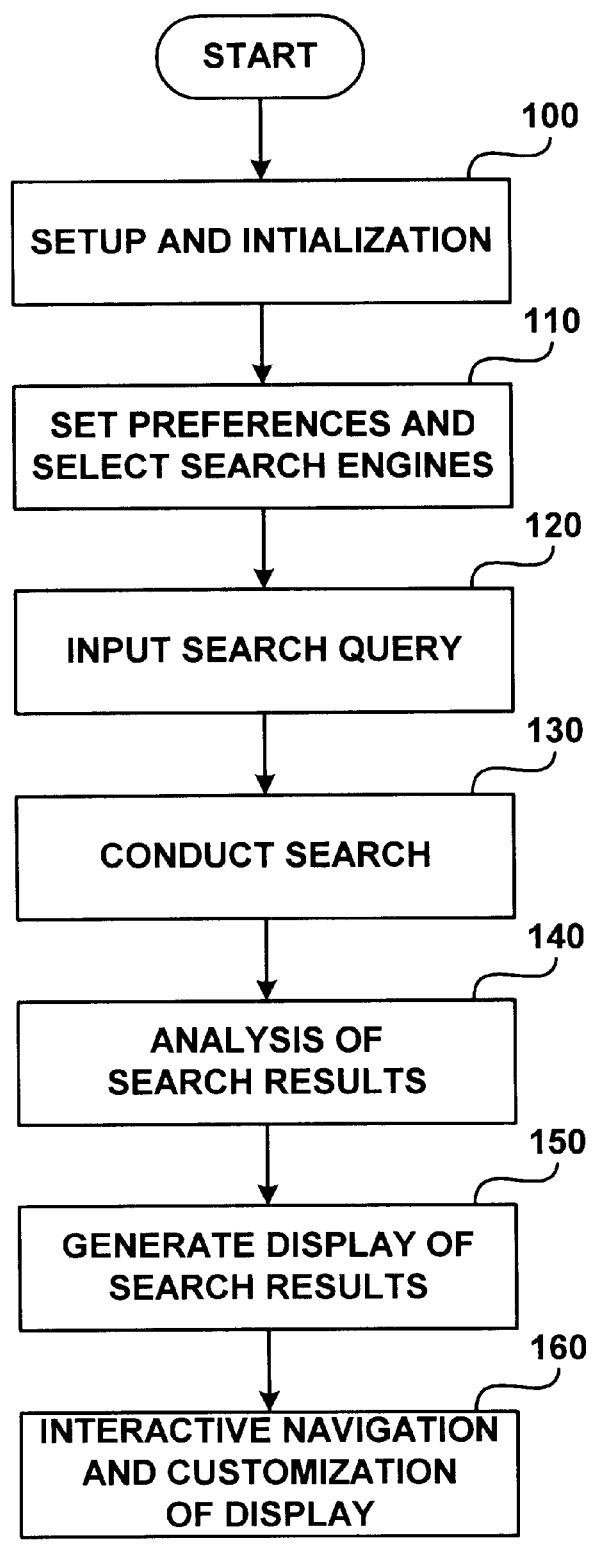
FIG. 2 is a flow diagram showing the general operation according to one embodiment of the present invention.

Turning now to FIG. 2, there is a flow diagram that illustrates the general operation of the process of the present invention. In the first step, step 100, general setup and initialization routines are performed. For example, the system may check to determine that the user is successfully connected and has access to the Internet. Next, in step 110, the user is presented with a plurality of different options from which the user must select to form a set of preferences which alter the operation of the routine. Preferably, the user will initially be presented with a number of default preferences which represent the selection of options that have been determined to be the common selections of a general user. Therefore, in step 110, if the user does not modify any of the options, the process will proceed based upon the default set of preferences presented by the system.

Referring for a moment to FIG. 3A, there is shown a sample screen that a user may be presented with in connection with step 110 of FIG. 2 to select between a number of options to determine a set of general preferences. Shown by way of example, the user may select or modify preferences relating to the maximum number of matches (or "hits") that may be returned from a search according to sites and pages, intensity for items displayed, a display space relevance profile, a selection of search engines and colors for items displayed. Many other options, such as font size and type, may also be presented for the user to further define preferences that will modify the operation of the routine. As will be evident, the options presented in the SET PREFERENCES AND SELECT SEARCH ENGINES screen may be readily implemented in a number of available software tools, many of which run in the popular Windows operating environment.

Figure 3B:
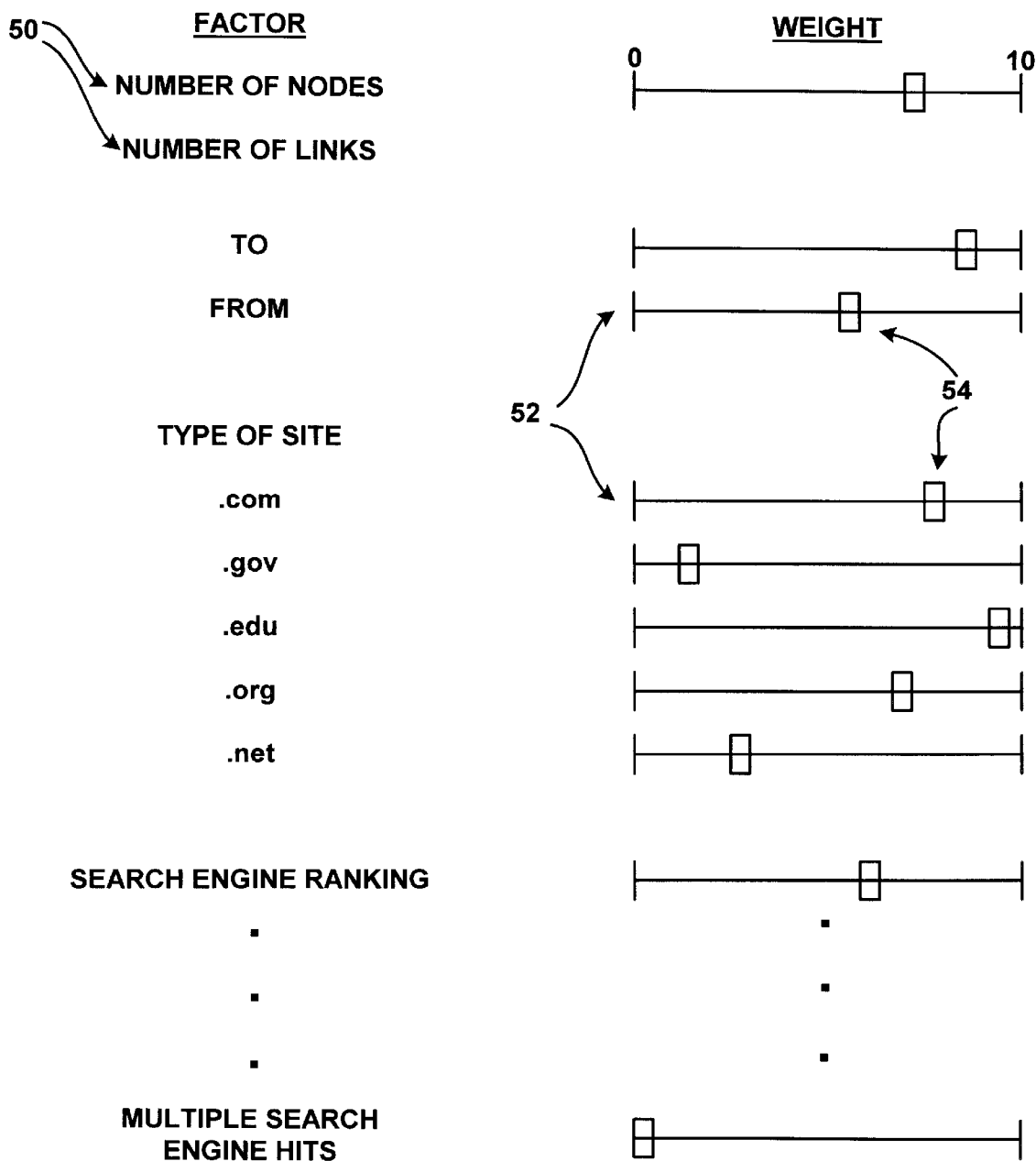
FIG. 3B is a representation of the screen presented to a user to define a search result relevance profile also in step 110 of FIG. 2.

Referring now to FIG. 3B, there is shown another sample screen that a user may be presented with further in connection with Step 110 of FIG. 2 to select between a number of options to define a search results relevance profile that is to be relied upon to "weight" various matches or "hits." According to the illustrated example, a number of different factors 50 are presented, the weight of each of which may be adjusted by the user. Next to each factor is provided a scale 52 that may be adjusted by the user. Each scale 52 has a range from 0 to 10 where 0 represents that the associated factor will not be considered in determining relevance and 10 represents that the associated factor will receive maximum consideration (or "weight") in determining relevance. Each scale 52 is also provided with a weight indicator 54 which may be adjusted by a user by, for example, clicking and dragging the indicator 54 along the scale 52. The first factor, NUMBER OF NODES, relates to the number of nodes found for a particular site. If there are many nodes found for a particular site and the NUMBER OF NODES weight factor is set high, such as to 9 or 10, then sites with the largest number of nodes will be determined to have the greatest importance. A similar weighting scheme is used for the other factors, as illustrated in FIG. 3B. The NUMBER OF LINKS factor relates to the number of links to and from a particular node and would likely be applied with respect to a group of nodes from a particular site. The TYPE OF SITE factor relates to weighting that is distributed according to the particular type of Web site found during the search. In the example, five different types of sites may be considered and have different weighting applied. The SEARCH ENGINE RANKING factor relates to how much weight should be applied to the relevance for a particular site as determined by the search engine used. As indicated, several additional relevance factors may be included as well. The MULTIPLE SEARCH ENGINE HITS factor would apply more weight if a site was found by more than one search engine than if a site was found by only one search engine. This factor would only be applied in a search that uses multiple search engines. The weighting applied by each of the relevance factors defines the search result relevance profile for the search and is an important aspect of how the system determines search result relevance and organizes information within the display space.

Referring back to FIG. 2, after all the preferences have been established, the search engines have been selected, and the search result relevance profile has been established, the procedure continues to step 120 where the user inputs a search query. Typically, the search query will comprise a number of words relating to a subject matter of interest to the user. For example, a user may input "golf masters" as the search query. In addition to particular search terms, the search query may include certain logical connectors to more precisely define the search. For example, a user may input "golf and masters" to indicate the logical ANDing of the term "golf" and the term "masters". As will be apparent to one of ordinary skill in the art, many conventional search engines are capable of parsing such logical expressions and conducting a search upon the logical combination defined by such a search query.

Next, in step 130, a search is conducted based upon the search query. According to one embodiment of the invention, a preexisting search engine will be called by the routine and will be supplied with a set of parameters with which to conduct the search. The main parameters supplied to the search engine are the search query and the maximum number of hits desired. In some instances, additional information may be supplied, such as specifying a particular subset of information available on the Internet upon which to conduct the search. For example, a user may specify that only commercial Web sites (i.e., sites with an address ending in ".com") should be considered in the search.

Next, in step 140, the search results generated from step 130 are analyzed in preparation for generating a display that will visually represent the search results. During this step, the process will operate to remove duplicate matches from the search, determine which matches should be grouped together, determine relevance of each of the matches and will "visit" each of the matches to determine which of the matches include "links" (i.e., a reference to an address for a different Web page) to other matches within the search results.

In step 150, the unique and advantageous display of the present invention is generated within a predetermined display space. According to an important aspect of the present invention, it is recognized that human comprehension of the search results can be greatly enhanced through an effective visual representation of the search results. It is also recognized that there is a predetermined display space, such as the screen from a user's monitor, and that the particular areas or positions within that display space can be considered to form a "relevance profile." For example, the display space, typically rectangular in dimension, can have a relevance profile where information that is positioned toward the central region of the display space may be considered to be more relevant than information positioned toward the periphery of the display space. Of course, the display space may have other relevance profiles, for example, information positioned at the top of the display space is considered more relevant than information positioned at the bottom of the display space.

Also in step 150, once the hits, matches, nodes or Web pages (in the case of a search on Internet information) are visually positioned and represented within the display space, the cross-connectivity between the various display nodes is also represented visually. According to a preferred embodiment of the invention, cross-connectivity is visually represented with arrows that extend between two nodes where the direction of an arrow illustrates the direction of the cross-connectivity. In other words, if a first node contains information that refers to a second node (i.e., a "link" to the second node), then this cross-connectivity will be visually represented by an arrow 37 (FIG. 1) between the first node and the second node and the head of the arrow 38 (FIG. 1) will be directed toward the second node to visually indicate that it is the first node that contains a link to the second node. From step 160, the user will have available certain options to save, delete or modify the search results display space, or to navigate the display space and examine various Web pages relating to the nodes represented in the display space. In addition, by clicking upon any of the nodes that are visually represented within the display space, the user may be presented with another screen display corresponding to the particular Web page for the selected node. Preferably, while the Web page is displayed, the search results display space remains on the screen as well to aid in navigation, but is reduced to a microversion that is positioned in a corner of the screen.

Figure 4:
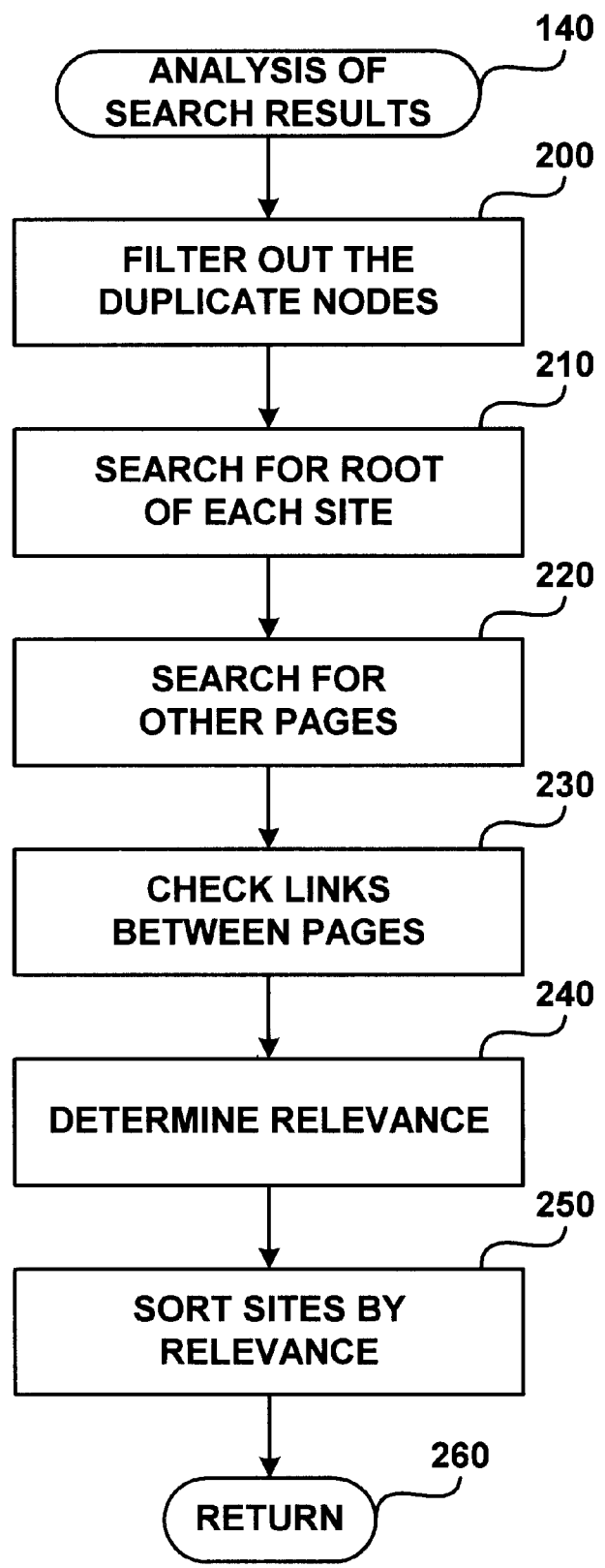
FIG. 4 is a flow diagram showing the operation of the ANALYSIS OF SEARCH RESULTS step of FIG. 2.

Turning now to FIG. 4, there is shown the flow diagram for the ANALYSIS OF SEARCH RESULTS routine corresponding to the step 140 of FIG. 2. This routine is entered after a search engine has performed an initial search based upon information from the search query and has returned with, for example, information giving to addresses of Web sites it located relating to the search query criteria and a relevance factor or ranking for each site located. When the routine is entered in step 140, the first step performed is step 200 where any duplicate nodes from the search engine are removed. Next, in step 210, the nodes are examined to determine the collection of different sites from which the nodes are located. For each unique site, a root node is determined. For example, a node having an address of "www.uiuc.edu/music/choral" has a root node of "www.uiuc.edu". Next, in step 220, the routine considers each node and determines if it includes a link to any other node which is also referred to by a link from another node found by the search. In other words, depending upon the search result preference settings, the routine may essentially add another node to the collection of search results if that node is referred to through a link from two or more other nodes located from the search. As should be apparent, other schemes may be used to add additional nodes to the search results. For example, a keyword or theme analysis may be performed based upon similar nodes within a particular site to determine if other nodes relate to the subject matter searched, even though they may not have been found by the search engine. Next, in step 230, each of the remaining nodes is examined to determine cross-connectivity between the nodes from the search. In other words, the links contained within each node is examined to determine if any links refer to other nodes from the search results. Typically, the existence of such a link is considered as well as the direction of the link.

In step 240, the search result relevance rating of each site is calculated depending upon a plurality of factors. The weighting applied to the factors will correspond to the search result relevance profile specified by the user, and will include factors relating to cross-connectivity, search engine relevancy ranking, type of site, etc. The relevance rating is a relative rating of any particular site with respect to other sites from the search results. It essentially represents the relevancy estimation of any particular site with respect to the other sites in the search results. According to an important aspect of the present invention, the relevancy rating is substantially more complex than prior art systems. In addition to the traditional relevancy ranking determined by the search engine (which is typically based upon the "closeness" of the search query terms to terms appearing in a node), other important factors are also considered such as cross-connectivity and type of site. The relevancy ranking determined by the search engine is only one of several different factors considered by the relevancy rating feature of the present invention. Moreover, as illustrated in connection with FIG. 3B, the present invention preferably provides the user with the ability to adjust the factors considered in determining relevancy to define a search result relevance profile. The search result relevancy rating is then utilized as an important aspect of how the search result information is organized within the display space.

Figure 5:
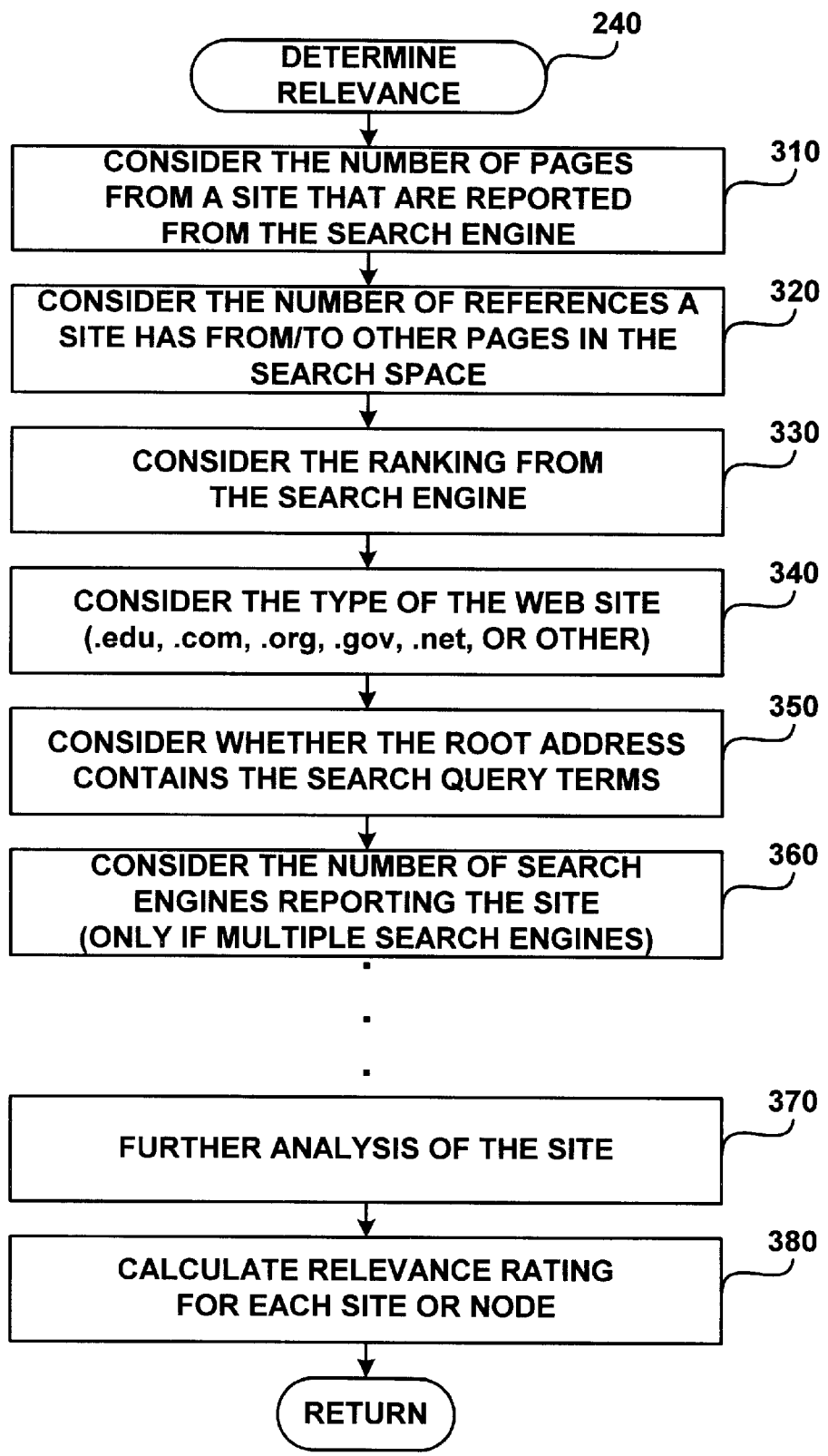
FIG. 5 is a flow diagram showing the operation of the DETERMINE RELEVANCE step of FIG. 4.

Turning for a moment to FIG. 5, there is shown a flow diagram corresponding to the DETERMINE RELEVANCE step 240 of FIG. 4. This routine illustrates by way of example a process that may be performed to calculate a relevance rating for each site or node of the search results. The relevance rating of each site, considered in connection with the display space relevance profile, determines where within the display space each site representation will be positioned. The steps of FIG. 5 are preferably performed in connection with a search result relevance profile as illustrated in FIG. 3B. For example, step 330 relates to a step for considering the ranking for a particular site within the search results which is returned from the search engine. If, however, the SEARCH ENGINE RANKING setting (FIG. 3B) is set to 0 for a particular search, the step 330 would essentially be skipped because the search result preference profile indicates that no weighting should be applied to search engine ranking factor. Thus, the settings of the search result relevance profile affect that operation of the DETERMINE RELEVANCE routine as illustrated in FIG. 5.

In step 310, the number of pages from a particular site is considered and the appropriate weighting factor is applied. When a search is conducted, typically a number of different Web "pages" or nodes will be returned and these form the search results. Most likely there will be several pages located in a variety of different sites. For example, as illustrated in FIG. 1, the "www.busdir.com" site includes three pages, while the "www.fujipub.com" site includes 14 pages. Depending upon the search results relevancy profile setting for this factor, in step 310 a site that has a greater number of pages will be more heavily weighted than a site that has a fewer number of pages.

Next, in step 320, the number of references or links to or from a site is considered. As should be evident from the search result relevance profile preference selections illustrated in FIG. 3B, the number of links to a site is a factor that may be considered separately from the number of links from the site. In other words, according to the user preferences, a user may consider that a site with a link to it is more important than a site with a link from it because, presumably, a link to a site may be an indication that the site is a "content" site (i.e., primarily provides information on the topic) rather than a "reference" site (i.e., primarily provides links to other sites). After the cross-connectivity factor is considered in step 320, the routine continues to step 330 where the ranking, if any, returned from the search engine is considered. In some cases, a search engine will merely sort the nodes comprising the search results in a particular order (usually with the most relevant node first) while in other cases a search engine may include a particular relevancy rating in the form of a number within a range of possible numbers (i.e., a number of 80 within a range of 0–100). Of course, if the search result relevance profile established by the user indicates that the search engine ranking factor should have a 0 weighting (i.e., not considered), step 330 would essentially be skipped.

Next, in step 340, the type of site is considered and the weighting indicated by the search result relevance profile is applied according to the type of site in the search results. Similarly, in step 350, a factor relating to whether the search query terms appear in the root address is appropriately weighted according to the weighting indicated for such a factor in the search result relevance profile. Next, in step 360, a factor relating to the number of search engines indicating a particular site as a "hit" is considered and weighted according to the search result relevance profile. This factor would, of course, only be considered in a search where more than one search engine was used and the search result relevance profile factor for MULTIPLE SEARCH ENGINE HITS (FIG. 3B) is set to a setting greater than 0.

As indicated between step 360 and step 370 of FIG. 5, any number of additional steps may be included to consider other factors that will affect the relevancy rating determined by the routine. In step 370, the routine may perform additional analysis of information available from each of the sites comprising the search results to provide an additional factor that will affect the relevance rating for a particular site within the search results. For example, the site may be analyzed to determine if it contains primarily textual information, image information, video information or audio information. Depending upon the search result relevance profile settings established by the user (or by default settings for a embodiment that does not provide an setting option for this factor), an appropriate weighting will be applied for each site in step 370.

Finally, in step 380, a relevance rating for each site in the search result is calculated and the routine returns back to the ANALYSIS OF SEARCH RESULTS routine of FIG. 4, which would then continue on to step 250. As will be apparent to one skilled in the art, calculation of the relevancy rating can be implemented in step 380 in a variety of different ways. For example, a particular relevancy value calculated based upon the factors considered in each of the prior steps could simply be added together to generate a total value representing the relevancy rating for each site. In an alternative technique, a more complex formula may be relied upon to generate a relevancy rating.

Turning back to FIG. 4, after the relevancy rating of each site is determined in Step 240, the routine continues to step 250, where the sites are sorted according to relevancy rating. This prepares the information for use in connection with generating a display organized according to relevancy. After the sites are sorted by relevance, the routine returns in step 260 to step 150 of the general flow diagram illustrated in FIG. 2.

Figure 6:
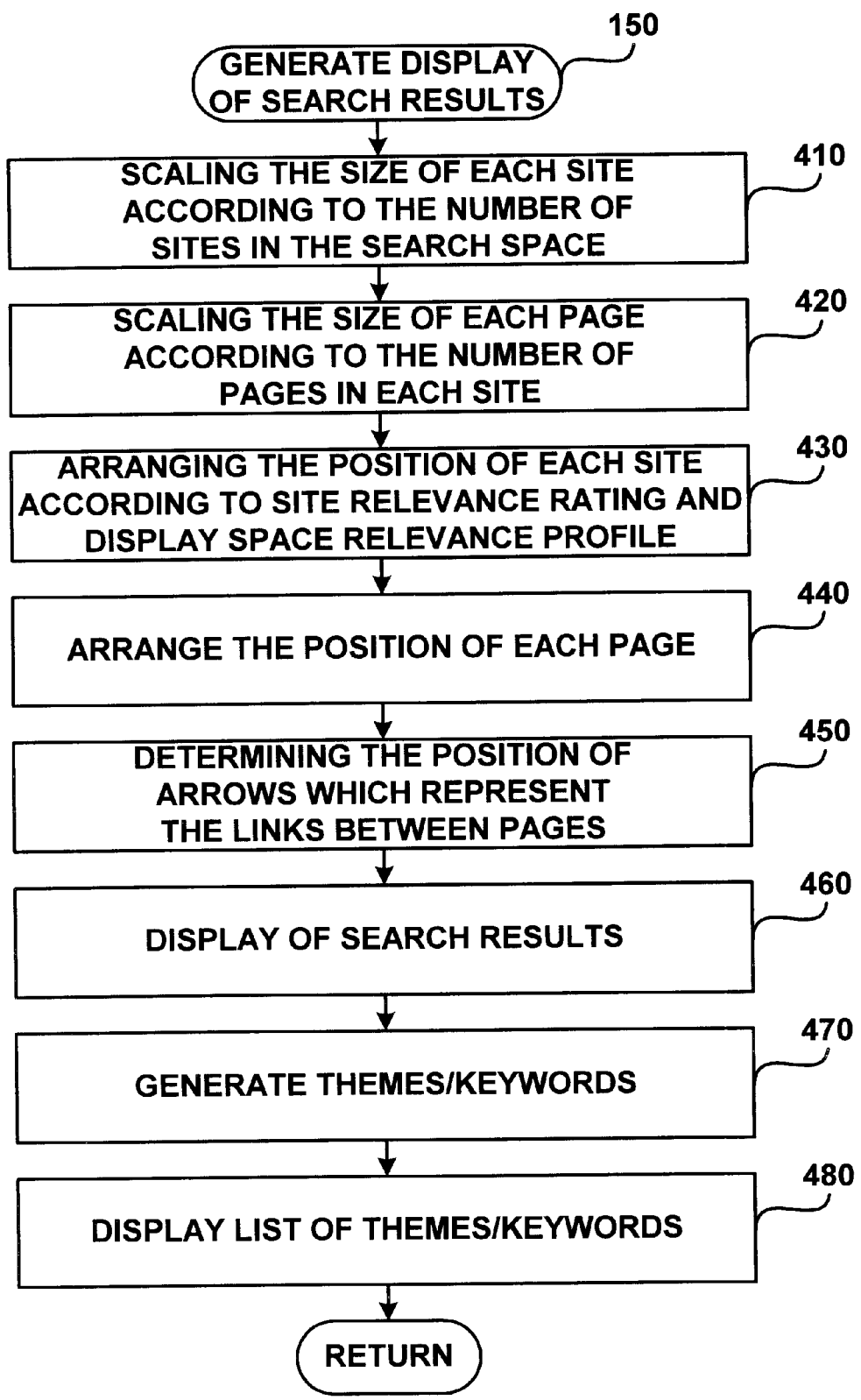
FIG. 6 is a flow diagram showing the operation of the GENERATE DISPLAY OF SEARCH RESULTS step of FIG. 2.

Turning now to FIG. 6, there is shown a flow diagram that illustrates the steps performed in connection with step 150 of the general flow diagram of FIG. 2. This routine involves the process of mapping the search result information to the display space depending upon the relevance rating of each of the sites and the display space relevancy profile. In the first step, step 410, the size of the visual representation of each site tree is scaled depending upon the size of the display space and the number of sites from the search results that are to be displayed in the display space. Next, in step 420, the size of the visual representation of each page or node is scaled according to the number of pages from the search results associated with the site. For example, a site with 20 pages will be visually represented with each page being scaled smaller than a site with 10 pages.

Next, in step 430, the position of each site within the display space is arranged according to the relevancy rating of each site and the display space relevance profile. For example, the site with the highest relevancy rating will be mapped (i.e., positioned) in the location of highest relevance according to the display space relevance profile settings. If the display space relevance profile settings are set according to an upper-left to lower-right manner, then the site with the highest relevance rating will be mapped to the upper-left position within the display space. Each site is accordingly mapped to the display space and the site with the lowest relevancy rating is, according to the upper-left to lower-right display space relevancy profile example, mapped to the lower-right position within the display space. Similarly, in step 440, each node (i.e., page) of the sites is arranged. As illustrated in FIG. 1, all the pages for a particular site may be grouped together in a tree fashion with the root node at the top. Other suitable arrangements are possible as well, and the particular arrangement used by the routine may also be user-specified as a preference.

After the position of each site within the display space and the position of each node associated with each site is determined in step 440, the routine continues to step 450 where the position of the arrows that represent links between various nodes is determined. Finally, in step 460, all of the display information is utilized to generate the display of the search results within the display space.

Next, in step 470, the procedure may generate a number of themes or keywords that relate to the search results. Such themes or keywords may be generated based upon the frequent occurrence of certain terms that are common to the different nodes or sites located from the search. For example, for a search for "restaurants," a frequently occurring term which may be relatively common to most of the sites might be the term "take-out", indicating that the particular restaurant would offer food on a take-out basis. In the same example, another theme might be related to national origin of the food (i.e., the ethnic cuisine), determining certain sites to be related to Italian food, others related to Chinese food, others related to French food, etc. In step 480, any themes or keywords determined in step 470 may be displayed within the display space. According to one embodiment of the invention, a user may select a particular theme or keyword organization so that the arrangement of the sites within the display space may be altered according to the relevancy of the sites with respect to the particular theme or keyword. Alternatively, instead of rearranging the position of the sites within the display space according to the theme or keyword, a visual indication of theme or keyword may be provided by using different colors or different display intensity for the various sites. For example, the most relevant site for the particular theme or keyword could be indicated by having the highest intensity (i.e., the brightest) while the least relevant site for the particular theme or keyword could be indicated by having the lowest intensity. According to this scheme, useful information relating to different themes or keywords may be readily indicated in the display space without rearranging the position of the sites within the display space.

After the set of themes or keywords is displayed in step 480 of FIG. 6, the routine returns to the main routine of FIG. 2 and continues to step 160 to allow a user to interactively navigate and customize the display space.

Figure 7:
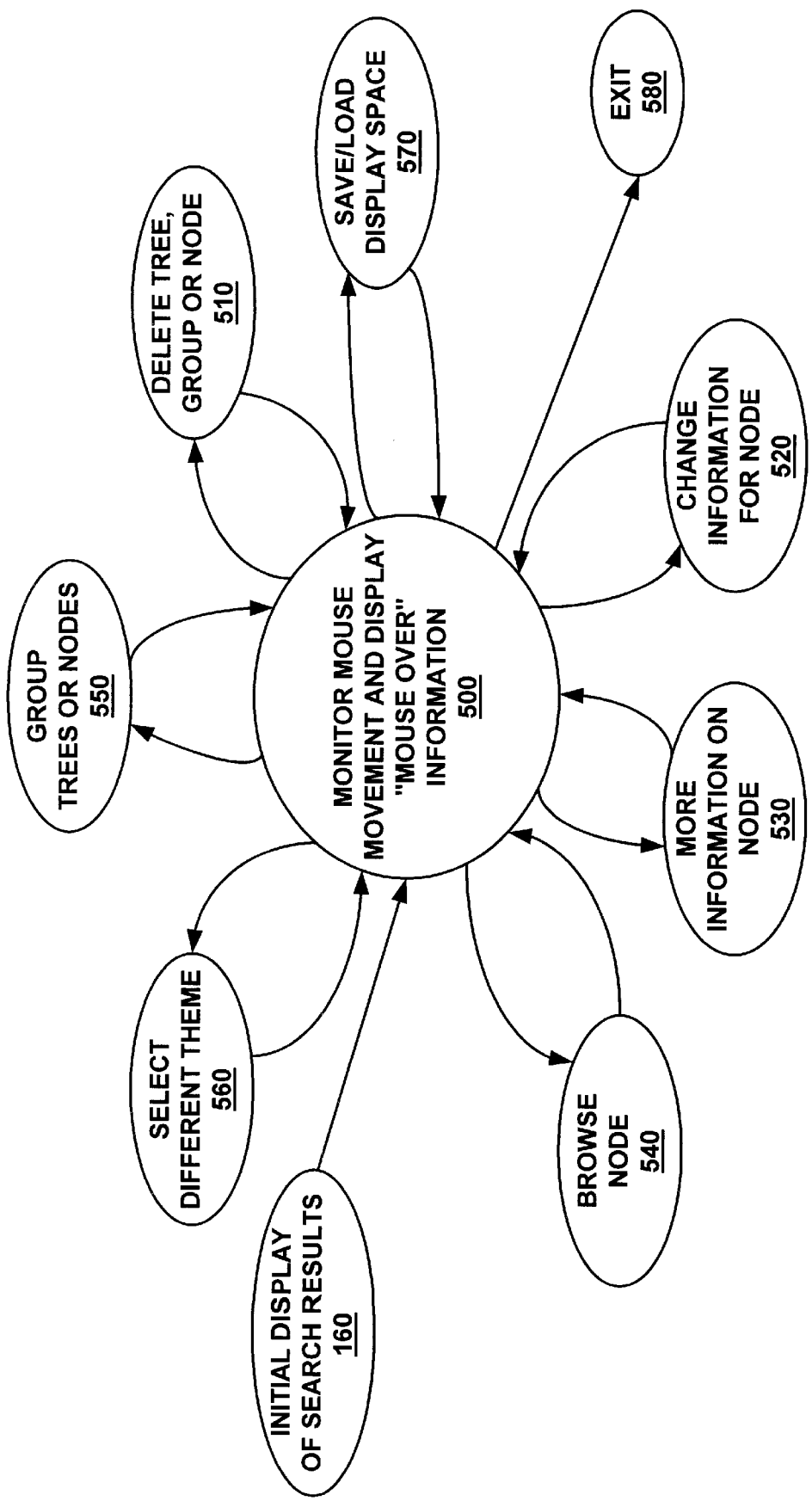
FIG. 7 is a state flow diagram showing the operation of the INTERACTIVE NAVIGATION AND CUSTOMIZATION OF DISPLAY step of FIG. 2.

Turning now to FIG. 7, there is illustrated as a state diagram the set of steps that may be performed relating to step 160 of FIG. 2. Starting from the initial display of search results within the display space in step 160, control is passed to a main state 500, where a user is presented with the display in the display space and may move a mouse to correspondingly move a mouse indicator about different positions on the screen. To aid the user in navigation and understanding information in the display space, "mouse over" information may be displayed; that is, information that automatically appears near the mouse that corresponds to the item or icon which is in close proximity to or underneath the mouse indicator. From this main state 500, the user may enter a number of different states by performing certain predetermined actions. For example, if a user positions the mouse on a particular node and simultaneously presses the "delete" key, control may be passed to state 510 which would perform an appropriate subroutine to delete the node. Such a subroutine may include steps confirming with the user that the delete operation should be performed prior to actually deleting the node. Similarly, in state 510, the user may be prompted as to whether the entire tree should be deleted or, in a situation where a user has specified an entire group of nodes, whether the entire group should be deleted. After performing the appropriate steps relating to the delete operation, control will be passed back to the main state 500.

In order to change information relating to a particular node, such as "mouse over" information or the site description for a site (instead of merely the root node address such as "www.stadiumview.com"), a user may enter state 520 by, for example, positioning the mouse indicator over a particular node, activating the right click button on the mouse and selecting a "change information" option from a set of options presented in a subwindow display. As will be apparent to one of ordinary skill in the art, the right click mouse button on the mouse may advantageously be used to present a user with a variety of different options, while the left click button will typically initiate a particular action, such as activating a Web browser program that displays the relevant Web page referred to by the mouse.

Once the "change information" option is selected in state 520, a subroutine may be launched to open another subwindow on the screen to prompt the user to enter different text or to specify an image that should be displayed in association with the selected node. Upon completing the tasks associated with changing the information associated with a node in state 520, control will return back to main state 500. In a similar manner, if a user desires additional information about a particular node (beyond the information that is available from the display space), such a function may be performed in connection with state 530 that may be entered by right clicking on a node and selecting an option for "more information". Such additional information may include notes prepared by the user or may include a short textual description of the node which is generated by the routine when sites are examined during the analysis stage (FIG. 4).

In order to "browse" a particular node (i.e., view the contents of the Web page for the node), a user may enter state 540 by activating the left click of the mouse when it is positioned over the desired node. Such an action will, for example, activate an Internet Web browser program, such as Internet Explorer by Microsoft Corporation or Netscape Navigator by Netscape Communications Corporation, which will display the contents of the Web page associated with the selected node. According to a preferred embodiment, while a user is browsing nodes within the display space, the Web browser program may occupy the entire screen area while the search result display space is reduced to a microview representation and is positioned in a corner of the screen and appears on top of the Web browsing window. According to this arrangement, the user may view the content of the selected Web page while at the same time referring to the microview representation of the search result display space. Upon completion of browsing the Web page in state 540, control may be returned to main state 500.

Figure 8:
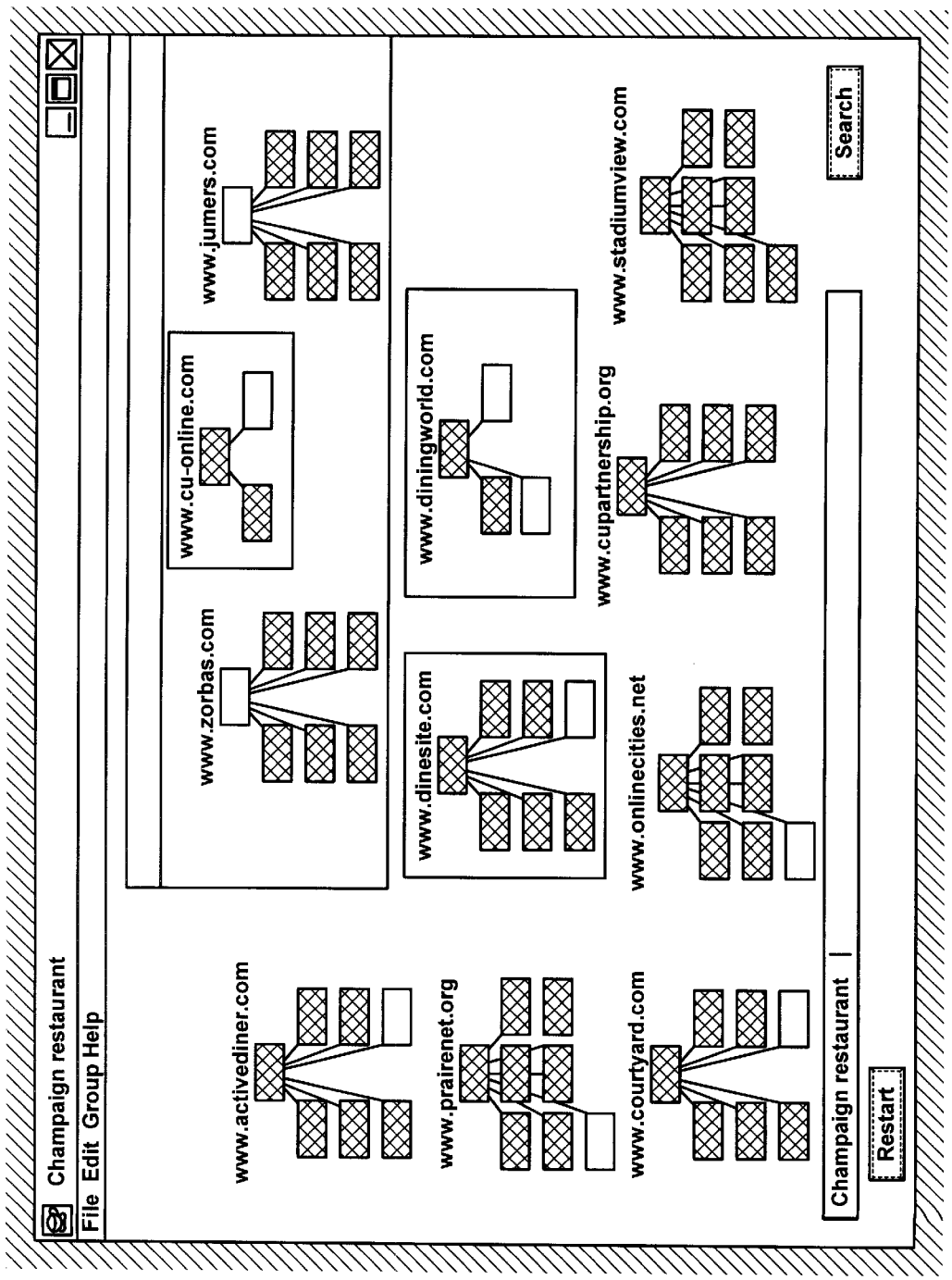
FIG. 8 illustrates an example of the search results display space according to an embodiment of the present invention that illustrates a customized display space where sites have been grouped according to a particular grouping determined by the user.

While in state 500, a user may enter state 550 by, for example, right clicking on a particular node or tree and selecting from a subwindow an option for "grouping". In state 550, the user may be prompted for additional information necessary to define the set of nodes, sites or trees that the user desires to be grouped together. An example of such a customized or user-defined grouping is illustrated in FIG. 8 where the user has selected three different sites "www.zorbas.com", "www.cu-online.com" and "www.jumers.com" and grouped them together. In connection with options that may be presented to the user in state 550 (FIG. 7), the user has further associated the title "Favorite Restaurant Sites" for the group, specified a box to define the group and has also specified a box to appear about the "www.cu-online.com" set of nodes. As can also be seen, the user has also defined a group box for the "www.dinesite.com" nodes as well as the "www.diningworld.com" nodes. After the user has completed the grouping in state 550, control will return back to main state 500.

Figure 9:
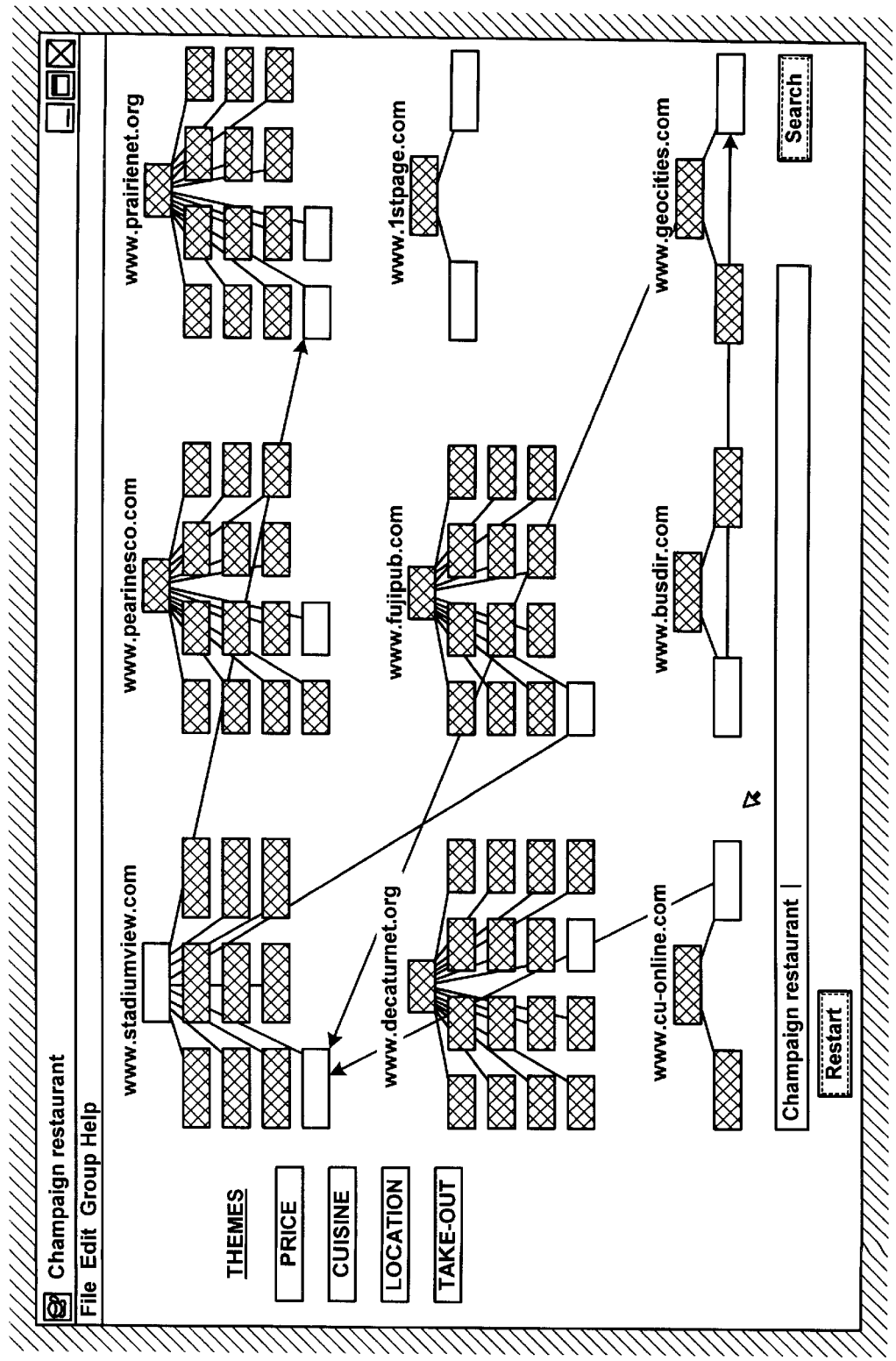
FIG. 9 illustrates an example of the search results display space according to an embodiment of the present invention where a user is presented with an option to have the display present a visual indication of a different theme.

In state 560, the user may specify a different theme to be visually represented in the display space. State 560 may be entered by an option selected from a right click of the mouse, but the display space may also include a number of different themes from which a user may select. An example of different themes that may be presented is FIG. 9 that illustrates a search result display space for the search query "Champaign restaurant". In this display space there is also presented in a column along the left side a number of different themes that the user may select. In the example of FIG. 9, the user may select between themes of "price", "cuisine", "location" and "take-out". By activating a mouse button while the mouse indicator is positioned over one of the theme representations, state 560 (FIG. 7) will be entered and the user may be prompted for additional information regarding the selection. For example, the user may be prompted as to whether the sites should be reorganized within the display space according to the relevance of the selected theme with respect to each of the sites. In this regard, if the "price" theme were selected, the sites for restaurants with the highest price may be positioned within the display space at the location with the greatest relevance according to the display space relevance profile. Instead of reorganizing the position of the site trees within the display space according to the theme, the user may instead select to have the theme visually represented by a different color scheme or some other visual indicator such as varying the intensity of the nodes to indicate how they relate to the theme. In this regard, if the "price" theme were selected, the sites for restaurants with the highest price may be displayed with the highest intensity, while the sites for restaurants with the lowest price may be displayed with the lowest intensity. After a different theme is selected in state 560, control may be returned to main state 500.

State 570 allows a user to save the current arrangement of the display space for future navigation or browsing or to load a different, previously saved display space to return to additional navigation or browsing. From main state 500, state 570 may be entered by selecting an option from a set presented from a right click mouse button, or alternatively, as is customary with many Windows applications, the "File" option near the top of the window may be selected to present a set of options from which the user may further select "save" or "load". After completing a save or load operation in state 570, control may be returned to state 500.

Finally, state 580 may be entered by selecting an "exit" option, perhaps from the "File" pull-down menu option, and further option of the program may be terminated. In a case such as this, the windows associated with the search result display space would be removed and control would likely be returned back to the user's operating system to perform other functions.

Figure 10:
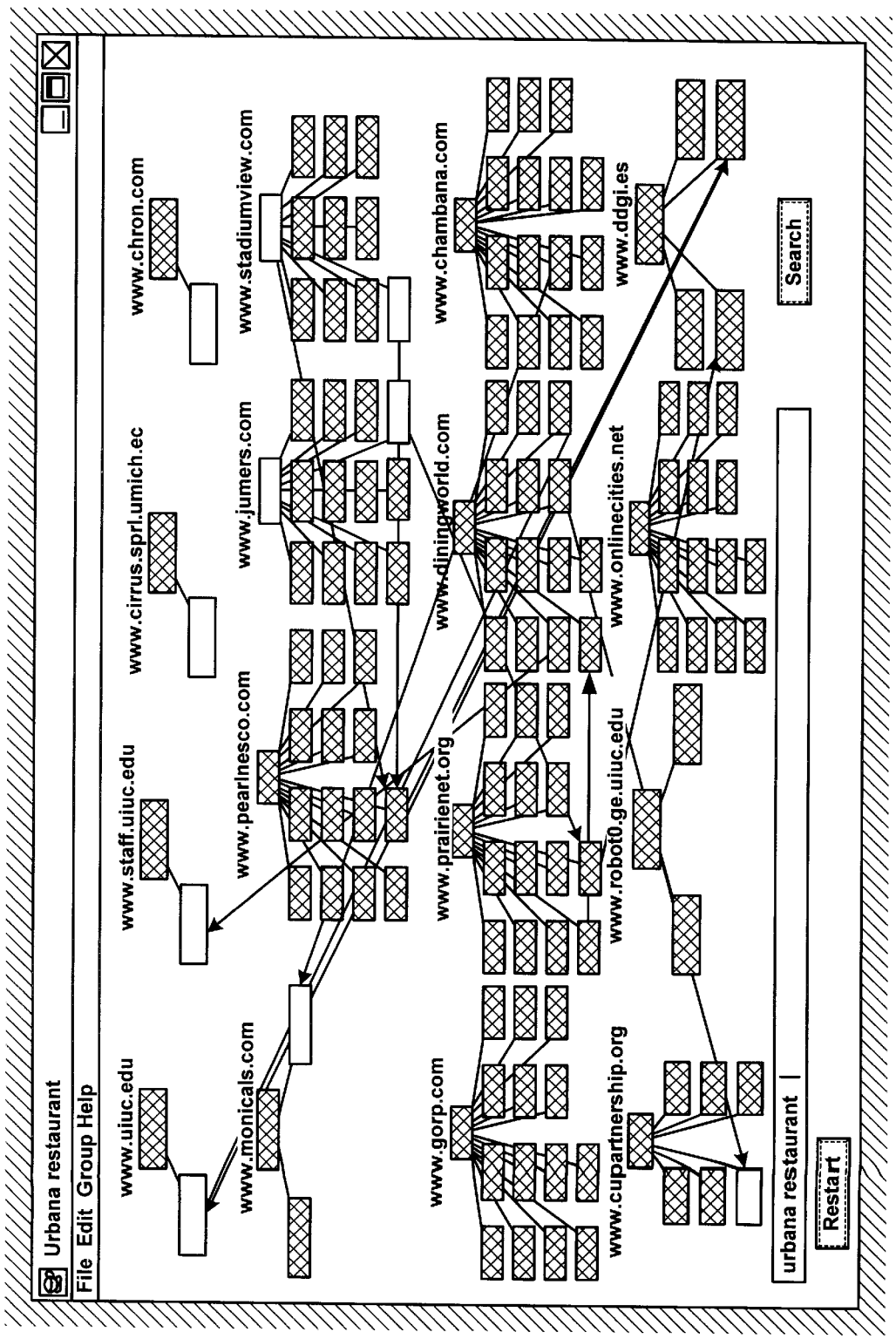
FIG. 10 illustrates another example of the search results display space according to an embodiment of the present invention.

Turning now to FIG. 10, there is shown another example of a search result display space for a search query for "urbana restaurant". As can be seen, 16 different sites were located from the search. As should be evident, it is possible that the search engine actually returned more than 16 sites, but the user specified that the maximum number of sites (for example, in the screen of FIG. 3A) should be limited to 16. As can also be seen from the example illustrated in FIG. 10, the display space relevance profile is specified as a central-to-outer arrangement where the most relevant sites (such as "www.pearlnesco.com", "wwwjumers.com", "www.prairienet.org" and "www.diningworld.com") are positioned in a central region of the display space while the least relevant sites (such as "www.uiuc.edu" and "www.chron.com") are positioned in the outer region or near the periphery of the display space. As can be seen, the site trees displayed in the central region of the display space have a much greater number of nodes than those site trees located near the edges of the display space. This provides an immediate visual representation to the user that the sites in the central region are likely more relevant than the sites in the outer region. Of course, if the user modified the search results relevance profile to set the NUMBER OF NODES setting to 0, then the display space would appear different because the number of nodes for a site would be a factor that is not given any weight (i.e., essentially not considered).

As can be seen from the foregoing, the present invention provides a unique and powerful tool capable of providing a comprehensive visual representation for allowing a user to quickly and effectively comprehend the organization, content and relevance of information relating to search results. Although the invention has been described herein primarily with respect to search information available on the Internet, the invention may be easily, effectively and advantageously utilized in any environment where a great volume of information is to be searched and which may be located across an expansive and complex network of systems that may not follow a consistent organization for the information.

Although only a few advantages of the system of the present invention have been described herein, a user will likely benefit from many additional advantages as well. For example, consider a search query for the term "fly". This relatively broad query will likely result in sites with information relating to (1) fly fishing, (2) the insect, (3) and airplanes. Each subject or theme of each of these groups is quite different. If presented merely with a long list of matches as would be the case with conventional search engines, the user would be faced with a laborious and frustrating task of sifting through the long list attempting to identify the subset of sites of interest. With the tool of the present invention, however, the user will likely find that the unique visual representation can greatly assist his comprehension of the search results and his ability to locate, navigate and browse the subset of sites of interest. What the user will find from the cross-connectivity visual representation provided by the arrows extending between nodes is that (1) sites relating to fly fishing will likely include links to other fly fishing sites, (2) sites relating to an insect fly will like include links to other insect fly sites, and (3) sites relating to "fly" in the aeronautical sense will likely include links to other aeronautical sites. The user of the present invention may immediately realize that such a search contains three distinct categories of sites by the cross-connectivity arrangement that is visually represented within the display space. Assuming, for example, that the user was primarily interest in the "fly" insect, the user could readily utilize some of the convenient functional features of the invention, such as the feature to allow a user to define site groups and to delete nodes or groups of nodes, to modify the contents of the display space to provide a search result display space that is advantageously tailored to his particular subject of interest.

It is to be understood that although the present invention has been described with reference to one or more preferred embodiments, various modifications, known to those skilled in the art, may be made to the structures and process steps presented herein without departing from the invention as defined by the appended claims.

What is claimed is:

1. A system for generating, within a predetermined display space, a visual representation of a plurality of Web pages accessible from a plurality of Web sites on the Internet, said system comprising:

means for receiving information relating to the addresses of said plurality of Web pages, means for determining the cross-connectivity between the plurality of Web pages, means for generating a relevancy rating for each of said Web pages, means for generating within the predetermined display space a visual representation showing the relevancy of each of said plurality of Web pages, including:

means for mapping within the display space a visual representation of each of said plurality of Web pages at a position within the display space dependent upon the relevancy rating of each of said plurality of Web pages.

2. The system of claim 1 further comprising:

for each pair of Web pages for which a cross-connectivity is determined, means for generating a visual representation of the cross-connectivity relationship between each of said pairs of Web pages.

3. The system of claim 1 further comprising:
means for defining a relevance profile for determining the relevancy rating of each of said plurality of Web pages based upon a plurality of factors.

4. The system of claim 3 further comprising means for generating a visual representation of the direction of the cross-connectivity relationship between each pair of Web pages.

5. The system of claim 3 further comprising means for modifying the relevance profile and for generating a different visual representation of said plurality of Web pages according to said modified relevance profile.

6. The system of claim 1 wherein said means for determining a relevancy rating for each of said Web pages determines the relevancy rating based upon at least one factor selected from the group consisting of: (a) extent of cross connectivity (b) type of Web site, (c) a keyword, and (d) a theme.

7. The system of claim 1 wherein said means for receiving information relating to the addresses of said plurality of Web pages comprises at least one Internet search engine and said means for determining a relevancy rating for each of said Web pages determines the relevancy rating based upon at least one factor selected from the group consisting of: (a) extent of cross connectivity, (b) number of times the Web page is located by said at least one search engine, (c) a relevancy ranking provided by said at least one search engine, (d) the type of Web site, (e) a keyword, (f) a theme, and (g) the number of said search engines locating the Web page.

8. The system of claim 1 further comprising means for interactive browsing of at least one of said Web pages.

9. The system of claim 1 wherein said visual representation of said plurality of Web pages is provided according to at least one representation selected from the group consisting of:

(a) a micro view representation, (b) a macro view representation.

10. The system of claim 1 further comprising means for modifying the plurality of Web pages and the visual representation of said plurality of Web pages by performing at least one task selected from the group consisting of: (a) adding at least one more Web page, (b) deleting at least one Web page, (c) varying the intensity of the visual representation of said Web pages, (d) varying the color of the visual representation of said Web pages, (e) changing the position within the display space of the visual representation of at least one Web page, and (f) presenting additional information associated with at least one Web page, (g) grouping together at least two Web pages.

11. A method for generating a visual representation of a plurality of information units representing a subset of information units from a universe of information units, said method comprising the steps of:

(a) conducting a search of said universe of information units to determine said plurality of information units, (b) analyzing said plurality of information units to determine a relevancy rating of each of said information units, and (c) generating a visual representation of said information units within a predetermined display space wherein said visual representation is organized at least in part in accordance with the relevancy rating of each of said information units.

12. The method of claim 11 wherein said step of conducting a search is performed by at least one pre-existing search engine for searching said universe of information units.

13. The method of claim 11 wherein said step of analyzing said plurality of information units considers at least one of the factors from the group consisting of: (a) the extent of a data relationship between one of said information units and another of said information units, (b) the type of information unit, (c) the location of said information unit, (d) a keyword relationship with said information unit, and (e) a theme relationship with said information unit.

14. The method of claim 11 wherein said step of conducting a search is performed by at least one pre-existing search engine for searching said universe of information units, and wherein said step of analyzing said plurality of information units considers at least one factor selected from the group consisting of: (a) the extent of a data relationship between one of said information and another of said information units, (b) the number of times said information unit is located by said search engine, (c) a relevancy factor for said information unit generated by said search engine, (d) the type of said information unit, (e) the location of said information unit, (f) a keyword relationship with said information unit, (g) a theme relationship with said information unit, and (h) the number of search engines that located said information unit.

15. The method of claim 11 wherein the universe of information units is the set of Web pages of the Internet.

16. The method of claim 11 wherein the universe of information units is accessed from a data storage medium selected from the group consisting of: (a) a mass storage device, (b) a plurality of mass storage devices, (c) a local area network, (d) a wide area network, and (e) the Internet.

17. The method of claim 11 further comprising a step of modifying said visual representation by performing at least one step from the group consisting of: (a) adding at least one more information unit, (b) deleting at least one information unit, (c) varying the intensity of the visual representation of at least one information unit, (d) varying the color of the visual representation of at least one information unit, (e) changing the position within the display space of the visual representation of at least one information unit, (f) presenting additional information associated with at least one information unit, and (g) grouping together at least two information units.

18. The method of claim 11 further comprising a step of interactively browsing information corresponding to at least one information unit.

19. The method of claim 11 wherein said visual representation of said information units is provided according to at least one representation selected from the group consisting of:

(a) a micro view representation, and (b) a macro view representation.

20. The method of claim 11 wherein said step of analyzing said information units is carried out using a different set of criteria for determining a relevancy rating for each of said information units, and wherein a different visual representation is generating by said step of generating a visual representation using a said different set of relevancy ratings for each of said information units.

* * * * *

UNITED STATES PATENT AND TRADEMARK OFFICE
CERTIFICATE OF CORRECTION

PATENT NO.    : 6,434,556 B1  
DATED         : August 13, 2002  
INVENTOR(S)   : J. Levin et al.

It is certified that error appears in the above-identified patent and that said Letters Patent is hereby corrected as shown below:

Column 16,  
Line 49, after "information" insert -- directly from an information retrieval system --  
Line 51, after "for" insert -- dynamically --  
Line 52, after "pages" insert -- without reference to precompiled information --  
Line 54, after "pages" insert -- said relevancy rating associated with the content of said Web pages --

Column 17,  
Line 57, after "units" insert -- without reference to precompiled information --  
Line 57, after "to" insert -- dynamically --  
Line 59, after "units" insert -- said relevancy rating associated with the content of said information units --

Signed and Sealed this

Tenth Day of December, 2002

JAMES E. ROGAN  
*Director of the United States Patent and Trademark Office*